United States Patent [19]

Takahashi

[11] Patent Number: 5,509,624
[45] Date of Patent: Apr. 23, 1996

[54] LANDING APPARATUS FOR AIRSHIP AND THE LIKE

[75] Inventor: Masakatsu Takahashi, 4-6, Narihira-cho, Ashiya-shi, Hyogo 659, Japan

[73] Assignee: Masakatsu Takahashi, Hyogo, Japan

[21] Appl. No.: 133,183
[22] PCT Filed: Jul. 6, 1992
[86] PCT No.: PCT/JP92/00860
  § 371 Date: May 25, 1994
  § 102(e) Date: May 25, 1994
[87] PCT Pub. No.: WO93/15953
  PCT Pub. Date: Aug. 19, 1993

[30] Foreign Application Priority Data

Feb. 17, 1992 [JP] Japan .................... 4-069284

[51] Int. Cl.$^6$ ............................................ B64B 1/66
[52] U.S. Cl. ............................................ 244/115
[58] Field of Search .................... 244/115, 116, 244/110 C

[56] References Cited

U.S. PATENT DOCUMENTS 1,446,440 2/1923 Abt ................................... 244/116
1,893,584 1/1933 Fritsche ........................... 244/115

FOREIGN PATENT DOCUMENTS 2581962 11/1986 France ............................. 244/115
564178 11/1932 Germany ........................ 244/115
3-235197 9/1988 Japan .............................. 244/115
1460160 2/1989 U.S.S.R. ........................... 244/115

Primary Examiner—Galen L. Barefoot
Attorney, Agent, or Firm—Antonelli, Terry, Stout & Kraus

[57] ABSTRACT

A landing apparatus for an airship or the like is composed of a windlass 2, 3 mounted on the lower part of said airship 1, a tugging hawser 4, 5 releasably wound in said windlass 2, 3, a mooring device 6, 7 connected to a leading end of said hawser 4, 5 and a lashing rope 9, 10 horizontally extended spaced relation from a landing space 8. The airship can be landed by its own power when the hawser 4, 5 hanging from the airship is engaged with the lashing rope 9, 10, and is wound by the windlass 2, 3. The airship can be landed on a narrow landing space 8 since the airship is not blown off by the wind.

6 Claims, 8 Drawing Sheets

LANDING APPARATUS FOR AIRSHIP AND THE LIKE

TECHNICAL FIELD

The present invention relates to a landing apparatus for an airship and a balloon (hereinafter referred to as an airship or the like). More particularly, the invention relates to an apparatus by which a relatively small airship can be accurately landed in narrow landing area and kept moored.

BACKGROUND ART

When an airship is landed, many ground crew have hitherto been required as show in FIG. 9. That is to say, two hawsers (or ropes) 73, 74, which are hanging down from a gondola or the like, are pulled by the ground crew who are divided into two groups 75, 76 (one is starboard (right) side group 75 and the other side group 76) just like a "tug of war". When the airship 71 approaches to the ground, yet another group 77 of the ground crew who stands by keeps the airship 71 from moving and lets wheels 78 of the airship 71 contact with the ground. A top of a mast 80 of a mast cart 79 (a kind of a truck which is upwardly provided with a mast on the loading space thereof) is connected to a stem 81 of the airship 71. Then, the airship 71 is moored such that the above state wherein the wheels of the airship contacts with the ground is kept.

The airship 71 has a big volume for its weight so that the airship is readily influenced by a wind. A buoyancy of the airship is balanced with a weight so that the airship is floating in the air. For this reason, the airship is moored by connecting only the stem 81 of the airship 71 to the mast 80 so that a hull can smoothly rotate around the mast 80 by means of the wheels 78. Thereby, even if the wind blows from any direction, the hull can be aligned with the wind direction and a stern of the airship can always be postured so as to be in the leeward direction. Accordingly, any excess force is not applied to the connecting part and the like when the airship is moored.

When the balloon such as a hot-air balloon is landed, it is slowly landed by reducing the buoyancy little by little.

The above conventional method for landing and mooring airship is suitable for a relatively large airship in consideration of the safety. However, there are such problems that not only many hands (ground crew) but also a wide landing area (corresponding to the area of a circle wherein a radius is a length between the stem and a stern of the airship) are required when the airship is moored. Therefore, such a conventional airship cannot land in an airship base which is not sufficiently equipped. Such a conventional airship cannot land in a remote mountainous place or on an isolated island. On the contrary, recently there a small airship wherein an attitude controllability is relatively high (for instance U.S. Pat. No. 5,071,090 which has already been proposed by the inventor of the present invention), so that the airship is expected to actively participate in Emergency Medical Service.

On the contrary, when such an airship is landed, a wide landing area is required since the airship is apt to be blown off by the wind.

The object of the present invention is to resolve the problem of the conventional landing method, and provide an apparatus wherein an airship or the like, particularly a small airship having high attitude controllability, can be safely landed by virtue of the controllability for itself, thereby contributing to an urban transportation substitution for a helicopter which happens to encounter the accidents and provide a convenient transportating means for the remote place in the mountains or the isolated islands.

DISCLOSURE OF THE INVENTION

According to a first aspect of the present invention, there is provided a landing apparatus for an airship and the like comprising:

(a) a tugging hawser;

(b) a windlass;

(c) a mooring device; and (d) at least one lashing rope;

wherein said windlass is mounted on a lower part of said airship; wherein said hawser which can be let out is coiled in said windlass; wherein said lashing rope is horizontally extended above a landing area with a distance from said landing area to land said airship or the like.

In the landing apparatus for an airship, the airship is preferably provided with at least two said windlasses such that a center of buoyancy is located therebetween.

In the landing apparatus for an airship, the apparatus is preferably provided with the lashing ropes such that at least two lashing ropes are crossed each other.

In the landing apparatus, one end of said lashing rope is retained by a bitt (or pole for coiling the lashing rope) so that the rope can be let out; a free end of the rope is detachably engaged with said bitt; said rope having a length to pass over the airship so as to be fixed.

When the airship and the like is landed by using the landing apparatus in accordance with the first aspect of the present invention, to begin with, the tugging hawser is let out from the windlass and hung from the airship. Next, the airship and the like is shifted horizontally or the hawser is directly gripped and controlled by a pilot or a crew so that the mooring device located in tip portion of the hawser can be caught by the bitt. At this time, there is a certain distance between the hawser and the landing place so that the mooring device can be easily engaged with the lashing rope. Then, the hawser is wound by the windlass from the hawser so that the airship gradually approaches the landing position, and finally is landed. After landing, pilot or the crew gets off the airship and firmly moors the airship by using the lashing rope or the like.

According to the landing apparatus of the present invention, many ground crew are not required, and landing and mooring work fundamentally can be performed solely by the pilot of the airship.

In the landing apparatus, the tugging hawsers are hanging from at least two places so that a buoyancy center is interposed therebetween. For this reason, when more than two tugging hawsers are coiled by the windlass the hawser with the hawsers aligning each other, the airship can be securely approached to the ground keeping the airship horizontal.

In the airship, the lashing ropes are arranged so as to be crossed. Accordingly, in whichever direction the airship and the like advances, the mooring device of the tugging hawser can be easily caught.

In the apparatus, wherein a free end of the lashing ropes released from the bitt is engaged with the bitt, after the airship and the like is landed, one end of the lashing rope is let go (or released), the lashing rope is extended over the airship so that the airship can be securely fixed to the ground and can avoid a damage caused by a strong wind.

The embodiments of the present invention will be explained with reference to the attached drawings as mentioned hereinafter.

BEST MODE FOR CARRYING OUT THE INVENTION

Figure 1:
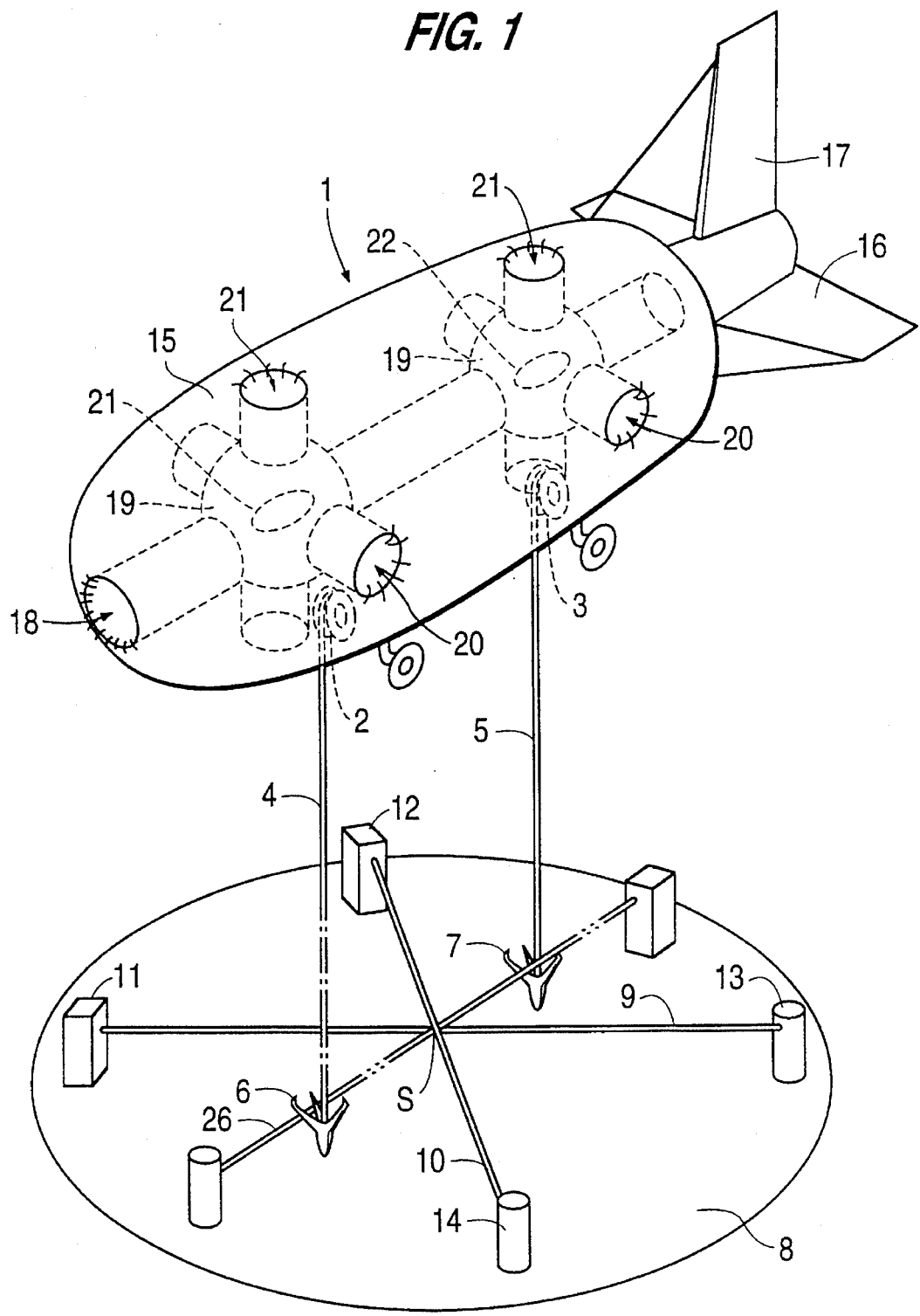
FIG. 1 is a perspective view illustrating an embodiment of a landing apparatus of the present invention.

In FIG. 1 an airship 1 is provided with two sets of windlasses 2, 3 in the lower part thereof.

From each of the windlasses 2, 3, tugging hawsers 4, 5 (or ropes) are let out and hung downwardly standing by to land. At the lower end of each hawser 4, 5, a hook-like or anchor-like mooring device 6, 7 is connected.

On the contrary, two lashing ropes 9, 10 are horizontally arranged in a landing area such that the lashing ropes cross each other with a certain distance from the landing area 8. Each rope 9, 10 is released from poles 11, 12 for coiling the rope with which the landing area is provided. Each free end of the lashing ropes 9, 10 is detachably engaged with one of the engaging bitts 13, 14 (a kind of a pole) which are arranged so as to be opposed to the poles 11, 12, respectively.

The airship 1 illustrated in FIG. 1 involves an ellipsoidal envelope 15 having a circular shape in section. The envelope 15 is divided into a plurality of cells in both right side and left side 1 and in both fore side and aft side of the airship by means of bulkheads. The airship 1 involves a pair of a horizontal tail arrangement 16 and a vertical tail arrangement 17 in a tail part (stern) of the airship. The airship 1 further involves an attitude control mechanism as mentioned hereinafter in the envelope 15. That is to say, the envelope 15 is provided with a cylindrical-shaped air pathway 18 along with a center line extending in the longitudinal direction (fore and back direction). Two nodes 19 having a spherical shape, a radius of which is larger than that of the air pathway 18, are provided in the air pathway 18. Each of the nodes 19 is radially provided with a horizontal air pathway 20 and a vertical air pathway 21 so as to communicate with the external. Each node 19 involves an apparatus 22 for generating a propulsion force wherein a direction of the propulsion force can be controlled. As a propulsion force generating apparatus 22, an engine with a variable-pitch propeller, a turbofan, an apparatus for generating a compressed air and the like can be employed.

The above-mentioned envelope 15 is filled with a lightweight gas such as a helium. However, the buoyancy of the airship may be generated by the air which is heated by the apparatus for supplying the hot gas. A center of buoyancy and a center of gravity are aligned on the same vertical line. The center of gravity is located in the lower part compared with the center of buoyancy. However, in order to improve maneuverability, particularly an attitude controllability, the center of gravity may be located at a place near the center of buoyancy.

The above-mentioned apparatus 22 may be used as a main propulsion engine, the propulsion generating apparatus 22 as a main propulsion engine may be used only for the attitude control, another propulsion generating apparatus (not shown) may be mounted on the tail part and the like in the airship. The attitude control of the airship is performed by adjusting inflow (inlet velocity) of the air which is taken in the openings located in both fore and back of the air pathway extending in the longitudinal direction, which air is injected out from the air pathway 20, 21, by virtue of operating a flap, a throttle valve and the like.

As the above-mentioned windlasses 2, 3, a winch which is normally used can be employed. For instance, the windlass comprises a rope drum, a supporting device which rotatably supports the rope drum and a means for driving the rope drum.

One end of each tugging hawser 4, 5 is engaged with the outer periphery of the rope drum and each hawser 4, 5 is coiled on the outer periphery of the rope drum. As a driving means for rotating the rope drum, a handle which is manually operated, a motor having the reduction gears and the like can be employed. The rope drum is preferably provided with a brake equipment.

A method for installing the windlass 2, 3 on the airship 1 is arbitrarily performed. However, a rotational shaft is preferably arranged so as to be parallel to the fore-and-back axis of the hull so that even if the airship is blown off by the wind blowing from the abeam direction when the airship is landed (referring to FIG. 6), the hawsers can be coiled or released smoothly. Only a single hawser may be arranged. In this case, the windlass is arranged so as to be in the lower side of the center of gravity. When two hawsers are arranged, the windlasses are arranged in fore-and-back side so that the center of buoyancy (or the center of gravity) is located therebetween. Then, the airship can be balanced when the airship is landed.

As a mooring device 6, 7, even a hook can be employed. The hook preferably has such a construction that an opening (or mouth) can be remotely controlled for fear that the hook which is engaged with the lashing ropes 9, 10 should be disengaged. When such a hook as to be remotely disengaged with the lashing ropes 9, 10 is used, the airship can take off without any support of the ground crew.

The height of the poles 11, 12 is not limited to a certain value. When the poles are arranged in a flat ground or a rooftop of a building, the pole employed may have a relatively lower height. When the poles are arranged in an up-and-down ground such as in the mountains and in a plain, the pole may have a relatively taller height in accordance with the lie of the ground. Each pole is rotatably provided with a rope drum in an upper part thereof so that the lashing rope 9, 10 can be wound up or released. The lashing rope 9, 10 is preferably connected with a hook in the free end.

However, the lashing rope without the hook can be tied to the bitts by means of a bowline knot which is a known art.

Each of the bitts 13, 14 has the same height as the poles 11, 12. Each bitt 13, 14 is provided with a device for engaging the hook.

As the tugging hawser 4, 5 and the lashing rope 9, 10, any rope can be employed. The hawser and the lashing rope are preferably made from a synthetic resin such as Kevlar (trademark of an aramid fiber, a product of E.I. Du Pont de Nemours & Co.) having high strength and light weight.

In order to land the airship 1 having a construction as mentioned hereinbefore, firstly the airship 1 is hovered in the air and advanced slowly so that the mooring device 6, 7 is engaged with the lashing rope 9, 10. In this case, the airship may be turned in a horizontal plane. The pilot or the crew may engage the mooring device with the lashing rope by drawing the tugging hawser 4, 5.

Secondly, the hawser 4, 5 is wound up by the windlass 2, 3 mounted on the airship 1. Thereby, the airship 1 comes nearer to the landing area 8 so that the airship can be softlanded. Then, the mooring devices 6, 7 or the like are engaged with the fixed rings which are secured in the landing area 8 so that the hull is made to be stable.

Figure 2:
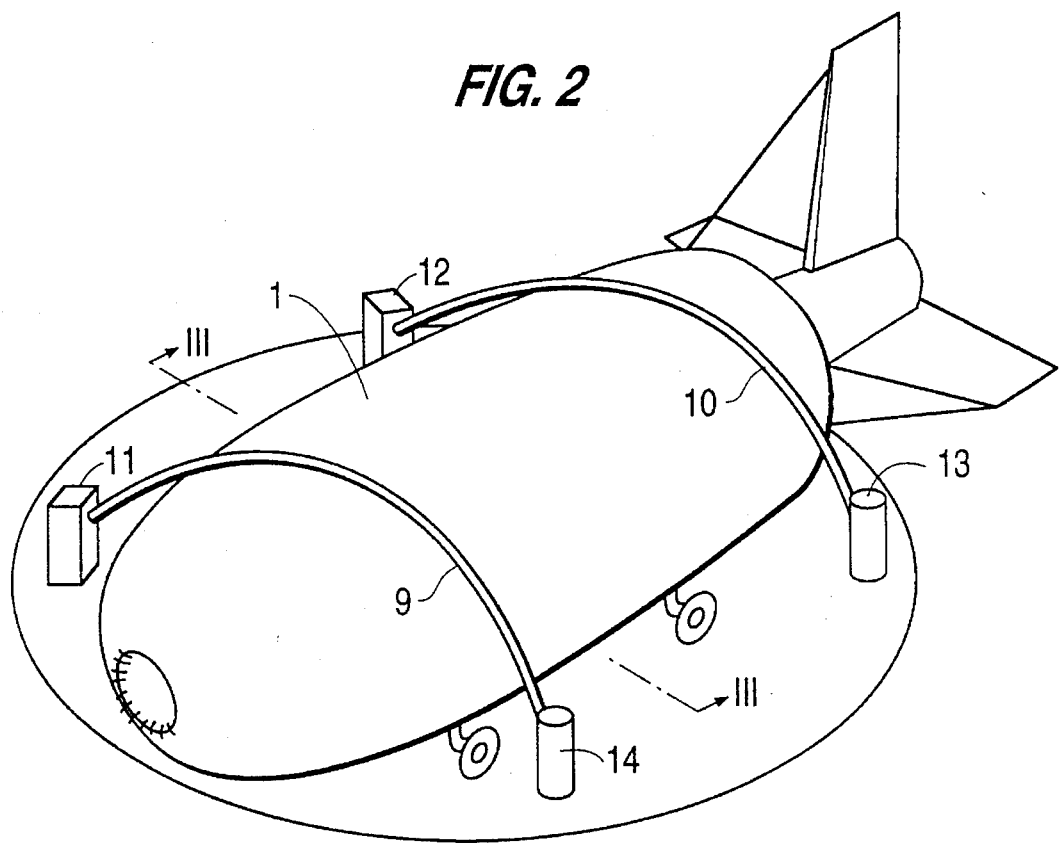
FIG. 2 is a perspective view illustrating a state wherein an airship lands on the ground and is moored by using the apparatus of FIG. 1.

Thirdly, the free end of each of more than two lashing ropes 9, 10 which-are crossed so as to have an X-like-shape are disengaged and the lashing ropes 9, 10 are passed over the hull so as to be paralleled as shown in FIG. 2. Then, the lashing rope 9 is engaged with the bitt 11 and the lashing rope 10 is engaged with the bitt 14.

Thus, the airship 1 can be safely moored in the landing area 8.

When the lashing rope 9, 10 is arranged so as to have an X-like-shape as mentioned above, even if the mooring device 6, 7 is slided on the outer surface of the lashing rope 9, 10 when the airship is blown off by the strong wind during the landing operation, either of the mooring devices 6, 7 is stopped at a point S wherein the two ropes 9, 10 are crossed. Therefore, the airship 1 is not remarkably deviated from the place where the airship is landed.

When the ropes 9, 10 are arranged so as to have an X-like-shape, there is another advantage as mentioned hereinafter.

Each of the ropes 9, 10 which is arranged so as to have an X-like-shape extends in the diagonal direction of a tetragon which is formed by the poles 11, 12 and the bitts 13, 14. Therefore, the distance between the pole 11 and the bitt 13 or the distance between the pole 12 and the bitt 14 is 1.4 to 1.5 times as long as a length of a side of the tetragon. Then, the distance between the pole 11 and the bitt 13 or the distance between the pole 12 and bitt 14 is substantially the same length wherein lashing ropes 9, 10 are passed over the airship so as to be paralleled.

For this reason, the rope 9, 10 is not unnecessarily required for winding up or releasing from the bitts 13, 14 as occasion demands, all four poles can be used as the bitts 13, 14 without using any pole for coiling.

Figure 3:
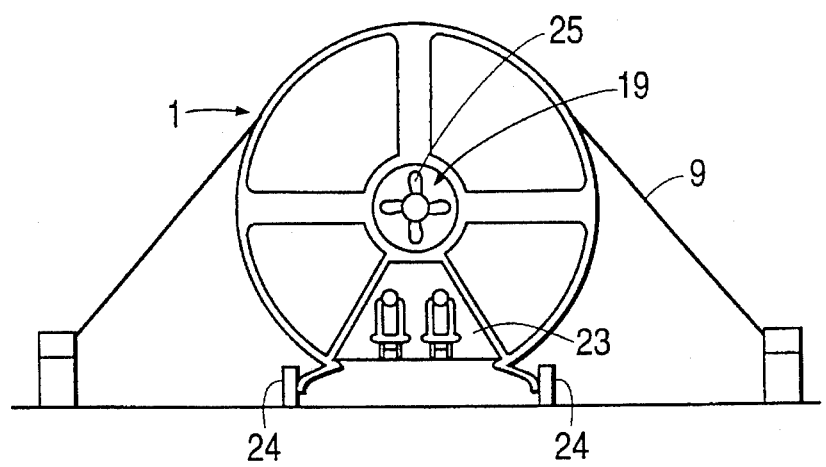
FIG. 3 is a sectional view taken along lines III—III in FIG. 2.

FIG. 3 illustrates a sectional view taken along with a line III—III of FIG. 2. A numeral 23 denotes a cabin and a numeral 24 denotes a wheel. A numeral 25 denotes a propeller in a node 19 and defines the propulsion generating apparatus as mentioned hereinbefore.

With respect to FIG. 1, the two lashing ropes are crossed so that the lashing ropes can be arranged to have an X-like-shape. However, the X-like-shaped arrangement of the two ropes can be achieved by drawing a center part of the ropes which are parallel and tying together by means of another rope. In this case, it is not necessary that the hook 9, 10 is once disengaged and engaged again as mentioned hereinbefore.

In both the above cases, if the lashing ropes 9, 10 are tied by using the other short rope at the point S wherein the ropes are crossed in approximately the center of the landing area, a tension of the ropes is strong so it is preferable.

When the apparatus of the present invention is used, the airship can be surely near the landing area.

For this reason, the airship can be securely landed on a ground construction such as a building or a marine construction such as a rig, a ship and the like. The landing area in the specification has a concept involving a place wherein such an airship can be landed.

In the above embodiment, the embodiment wherein two ropes 9, 10 are arranged so as to have an X-like-shape was explained. The landing apparatus of the present invention is not limited to such an embodiment. For instance, as shown in a phantom line FIG. 1, the landing apparatus can include an additional rope 26 extending in the fore-and-back direction (longitudinal direction of the airship) so that three lashing ropes are crossed so as to have a star-like-shape.

Figure 4:
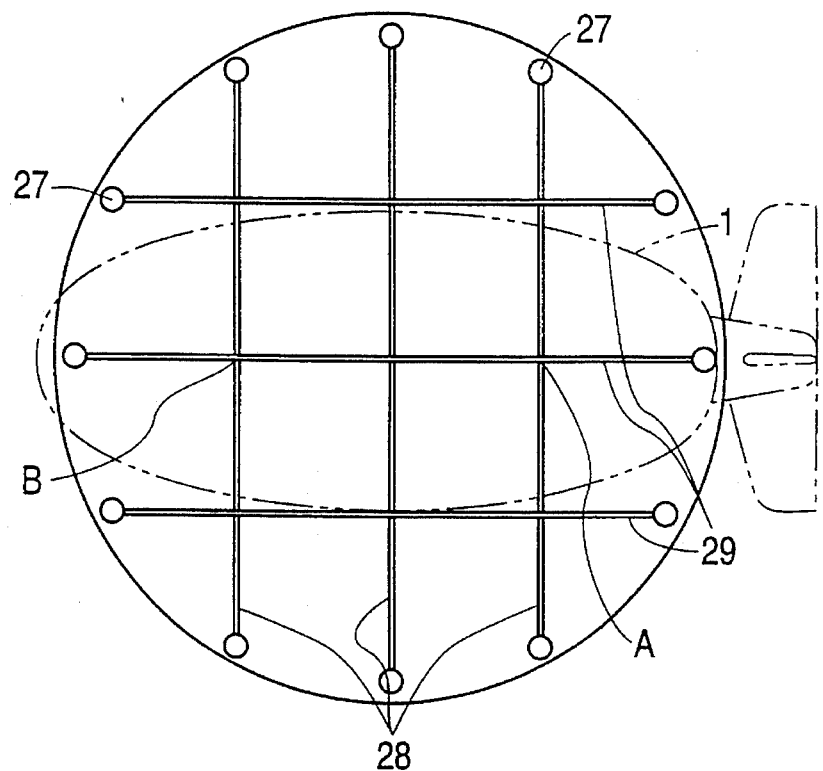
FIG. 4 is a plan view illustrating another embodiment of lashing rope of the present invention.

As shown in FIG. 4, the landing apparatus, wherein many bitts 27 which are circularly (or tetragonally) arranged and groups 28, 29 of lashing ropes which are arranged horizontally and vertically respectively so as to be latticed by using the above bitts 27, can be employed.

Figure 5:
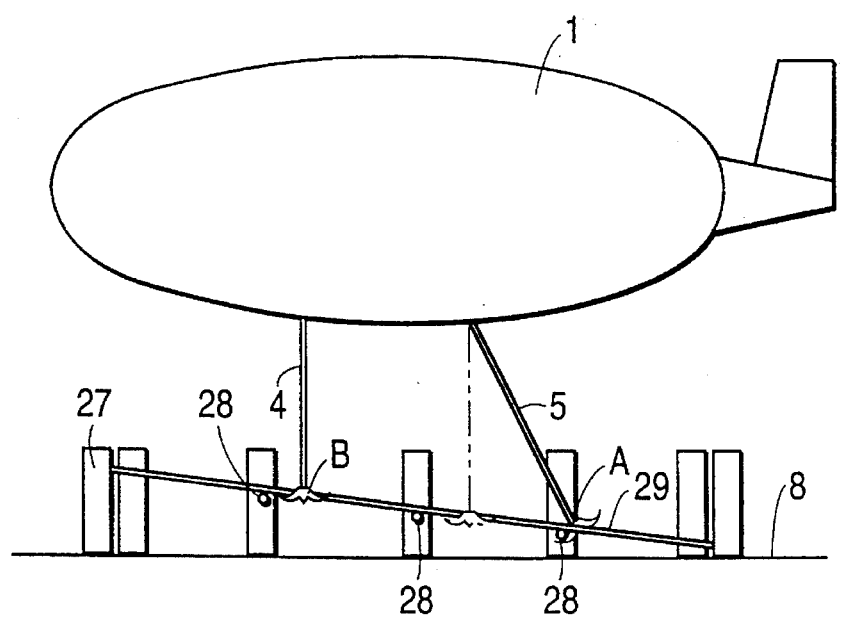
FIG. 5 is an elevational view illustrating another embodiment of a landing apparatus of the present invention.

In this case, as shown in FIG. 5, in the two hawsers 4, 5 hanging from the airship 1, the fore (bow) side hawser 4 is preferably somewhat shortened compared with the back (stern) side hawser 5. Thus, the airship 1 can be landed without pitching, rolling and yawing with a stable attitude. That is to say, when the airship is landed, a pilot can control the attitude of the airship by adjusting an angle of blade for flow control or an opening of vents 49a to 49e mentioned hereinafter so that the fore-and-back axis of the airship is paralleled to one of the lashing ropes of the groups 28, 29 of the lashing ropes which are arranged horizontally and vertically respectively. Then, as the airship 1 advances, firstly the hawser 5, which is the side of the stern, is engaged with one of the lashing rope of the groups of the lashing ropes 28, 29 which is substantially perpendicular to the fore-and-back axis of the hull at the center A of the lashing rope so that the advancing velocity is reduced and the airship goes down with horizontal advacing. Secondly, the fore side hawser 4 is engaged with the lashing rope. Therefore, the airship does not yaw so that the airship can be stably landed.

The group 28 of the lashing ropes which are arranged so as to be horizontally paralleled may be arranged such that the more the airship advances forward, the taller each height of the lashing ropes from the landing area becomes.

Figure 6:
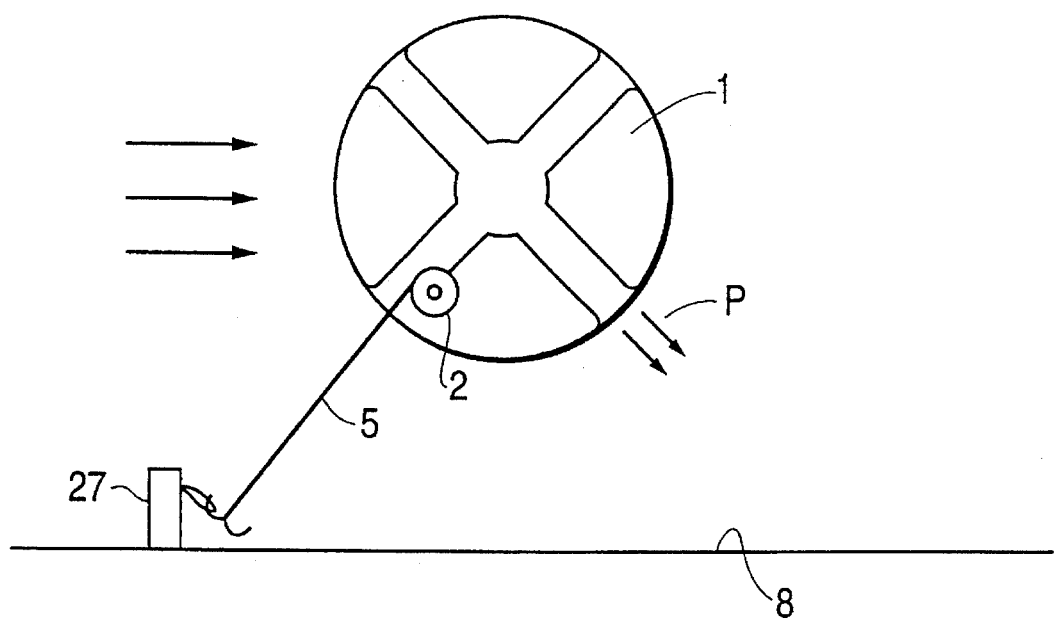
FIG. 6 is an elevational view illustrating an example of a state of using a landing apparatus of the present invention.

FIG. 6 illustrates a state wherein the airship is prevented from driving by means of the hawser 5 when the airship is blown off by the wind during the landing operation. In this case, the airship can be landed safely if the hawser 5 is coiled by the windlass 2 with adjusting an incline of the airship by jetting the air from the horizontal air pathway 20 as shown in an arrow P.

Next, the embodiment wherein the landing apparatus of the present invention is applied to the balloon will be explained with reference to FIG. 7.

Figure 7:
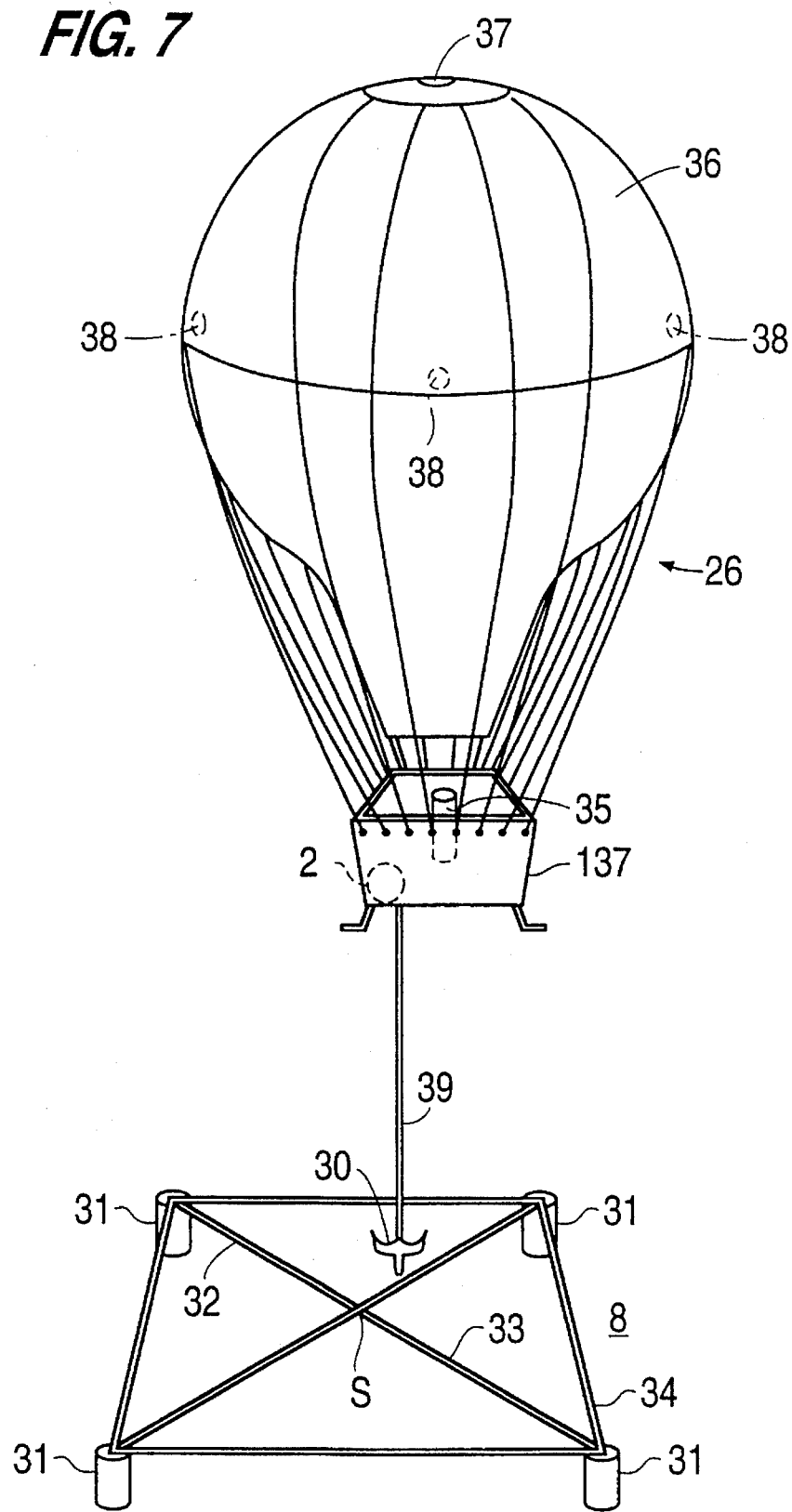
FIG. 7 is a perspective view illustrating an embodiment wherein a balloon employs the landing apparatus of the present invention.

In FIG. 7, a numeral 26 denotes a balloon. A gondola 137 of the balloon is provided with only windlass 2. The hawser 39 which is released from the windlass 2 hangs from the bottom part of the gondola 137 and the hawser 39 is connected with a hook-like-shaped mooring device 30 in the lower part thereof. Four bitts 31 are fixed on the landing area 8. Two lashing ropes 32, 33 extend between bitts 31 diagonally so as to have an X-like-shape. In the embodiment an outer peripheral lashing rope 34 is extended so as to surround the four bitts 31.

The above-mentioned balloon 26 may be a normal balloon, wherein an envelope 36 is filled with gaseous helium or the like, or a hot-air balloon. In the hot-air balloon, a buoyancy is generated by heating the air in the envelope 36 by means of burner 35 (or an air heater and a blower).

In whichever balloon may be used, buoyancy can be reduced by venting gas or air from a top vent 37.

With respect to this type of balloon, the landing method is the same as that of the airship as mentioned hereinbefore. That is to say, when the vent 37 is opened, the buoyancy is reduced. For this reason, the balloon 26 goes down. At this time, the hawser 39 is hung so that the mooring device 30 is engaged with the lashing ropes 32, 33, 34 and the hawser 39 is wound up to be drawn. Thereby the airship can be landed immediately and safely at the landing area 8.

The hawser 39 may merely be hung and may be positively thrown at the lashing rope 32, 33 34 by a pilot or a crew. When the hawser 39 is thrown at the lashing rope, the point S, wherein the lashing ropes 32, 33 are crossed so as to have an X-like-shape, can be a target.

The envelope 36 can be radially provided with four side vents 38 on the equator thereof. Thereby the propulsion force in the lateral direction can be generated by opening any one of the side vents.

The balloon 26 can be provided with a propulsion means such as a propeller so that the propulsion force in the lateral direction is generated.

When the balloon 26 is provided with propulsion means, there is an advantage that landing can be more easily performed.

Next, an embodiment of the airship, wherein the landing apparatus of the present invention can be effectively utilized, will be explained.

In the airship of FIG. 1, the envelope is filled with a gas having a light weight, such as gaseous helium. The present invention is not limited to the airship of FIG. 1. The principle of the hot-air balloon mentioned the above may be applied to the airship.

Figure 8:
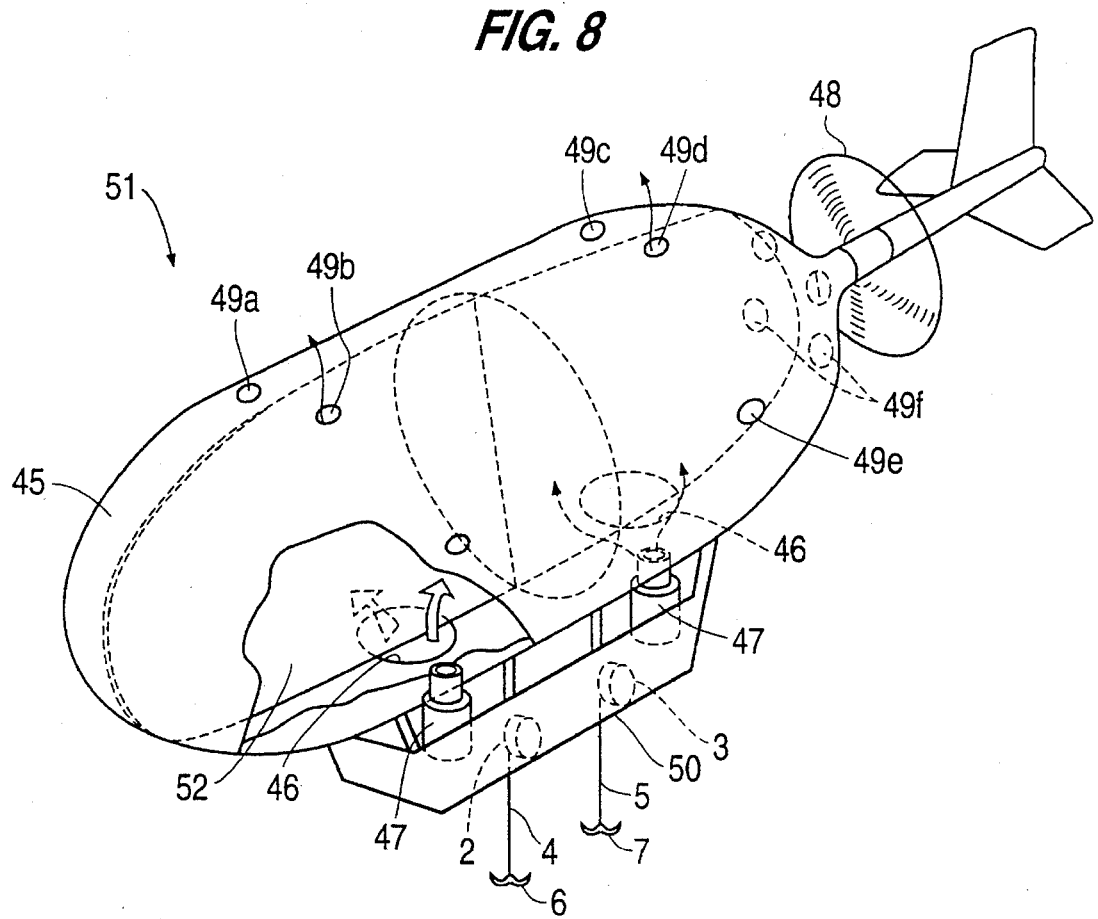
FIG. 8 is a perspective view illustrating an embodiment wherein the landing appratus of the present invention is applied to a hot-air balloon type airship of the present invention.
Figure 9:
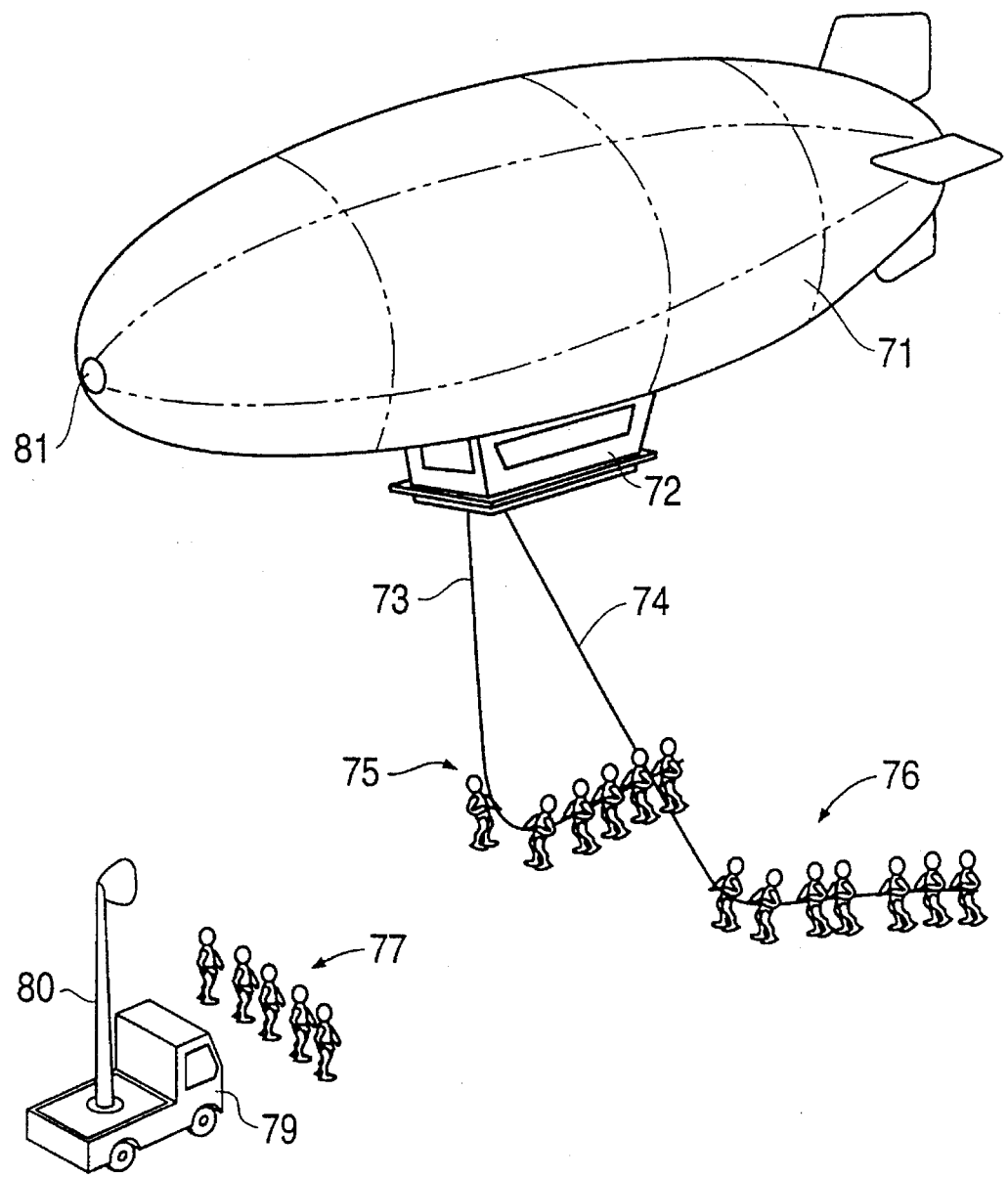
FIGS. 9 and 10 show prior art landing arrangements.
Figure 10:
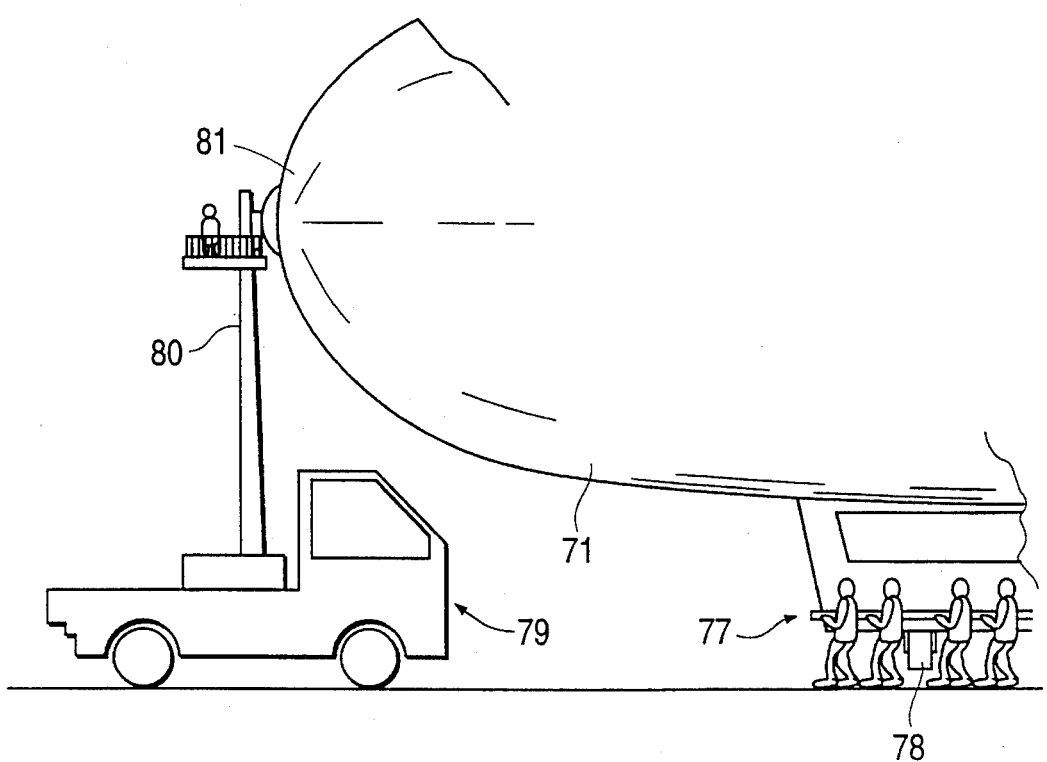

As shown in FIG. 8, openings 46 are formed in a lower part or side part of an ellipsoidal envelope 45 and a set of heated gas supplying apparatus 47 such as a gas burner used for the hot-air balloon can be arranged so as to be opposed to the openings 46. With respect to this embodiment, a combustion gas which is generated in the heated gas supplying apparatus is supplied to the envelope 45, thereby a buoyancy is generated. As the heated gas supplying apparatus 47, a gas burner, a blower combined with an air heater and the like can be employed. The number of the heated gas supplying apparatus 47 and openings 46 is not limited particularly. The airship may be provided with a set of heated gas supplying apparatus. Further, the airship may be provide with two sets of the heated gas supplying apparatus in both fore and aft parts. Further, the airship may be provided with three sets of the heated gas supplying apparatus in the suitable parts thereof.

The above-mentioned envelope 45 has a rigid body construction composed of frame material (not shown), and provided with propulsion force generating apparatus 48 in the back side. Vents 49a to 49f for venting the air are formed in a top part, a side part or aft part of the envelope 45. Each vent can be remotely controlled by the crew in the gondola 50 so as to be opened or closed. With respect to the airship of FIG. 8, the vent 49f located in the back side of the airship is opened so as to contribute to the propulsion force. When opening of the vent 49e located in the side part and the vents 49a to 49d located in the top part are adjusted, a trim of the airship can be changed.

In the airship of FIG. 8, the windlasses 2, 3, the hawsers 4, 5 and the mooring device 6, 7 are installed.

The airship 51 having a construction as mentioned hereinbefore can iteratively repeat to go up and go down freely by adjusting a burning velocity of the gas burner 47 or by adjusting a gas volume of the blower. When the vents 49a and 49b located in the fore side are opened, the stem of the airship goes down. When the vents 49c and 49d located in the back side are opened, the stern of the airship goes down. The airship turns to the right or left by operating the side vents 49e. When the vent is opened, the gas filled in the envelope 45 is jetted, and a reaction is applied to the hull. For this reason, such a movement can be generated. When the gas having a high temperature is vented by opening the upper vent, the temperature in the envelop is reduced. Therefore, specific gravity increases so as to contribute to the trim of the hull.

In the airship of FIG. 8, a bulkhead 52 wherein the envelope 45 is divided into fore and back part (or compartment) and right and left part (or compartment) may be installed. The heated gas supplying apparatus in accordance with the number of compartments may be arranged with a selecting means or selecting valve for changing the compartment which, the gas of high temperature generated by the heated gas generating apparatus is charged. In such a case, the trim can be rapidly controlled.

With respect to the airship of FIG. 8, the envelope (particularly in the neighborhood of the opening 46) is preferably made from a sheet having superior heat resistant and flame retardant property.

According to the landing apparatus of the present invention, the airship or the like, particularly the small airship having superior attitude controlability can be landed by itself without any ground crew. Since the airship not required for a wide landing space, the airship can be landed even on a narrow space such as a rooftop, an a mountain place. Accordingly, the airship can be applied to the means for communicating as a substitute for a helicopter and the like even in a place inconveniently situated.

According to the airship of FIG. 8, since the operation of going up and down can be rapidly performed, the above-mentioned landing apparatus is effectively utilized. When the above-mentioned airship is provided with the suitable apparatus for generating propulsion force, the airship is not influenced by the strong wind such as typhoon wherein a wind speed is 50 m/sec blowing in the abeam direction of the airship by virtue of the compressed air jetted from the lateral or vertical air path. For this reason, the airship can navigate with a desired direction safely.

I claim:

1. A landing apparatus for an airship or the like comprising:

(a) a tugging hawser;
    (b) a windlass;
    (c) a mooring device;

(d) at least two lashing ropes;

wherein said windlass is mounted on the lower part of said airship;

wherein said hawser is coiled in the windlass and can be spooled out; wherein said mooring device is connected to said tugging hawser for engaging at least one of said lashing ropes during landing of said airship; and wherein said lashing ropes are horizontally extended above a landing space; and (e) separate means for fixing both ends of each of said lashing ropes above said landing space until said airship has completed landing.

2. The landing apparatus for an airship of claim 1, wherein said airship or the like is provided with at least two windlasses.

3. The landing apparatus for an airship of claim 1, comprising at least two pairs of windlasses mounted in both fore and back parts on the lower part of said airship such that a center of buoyancy of the airship is interposed.

4. The landing apparatus for an airship of claim 1, wherein said at least two lashing ropes are crossed each other.

5. The landing apparatus of claim 1 wherein said means for fixing comprises bitts for respectively retaining one end of each of said at least two lashing ropes so that the ropes can be let out; a free end of each of said ropes being detachably engaged with a respective one of additional bitts; said ropes having a length to pass over the airship so as to be fixed for safely mooring the airship after it has landed.

6. The landing apparatus for an airship of claim 1, wherein the length of each of said at least two lashing ropes is greater than the width of said airship.

* * * * *